May 16, 1950
G. W. BARLOW
2,507,750
HOT-WATER BOTTLE STOPPER AND HEAT MAINTAINER
Filed Aug. 20, 1948
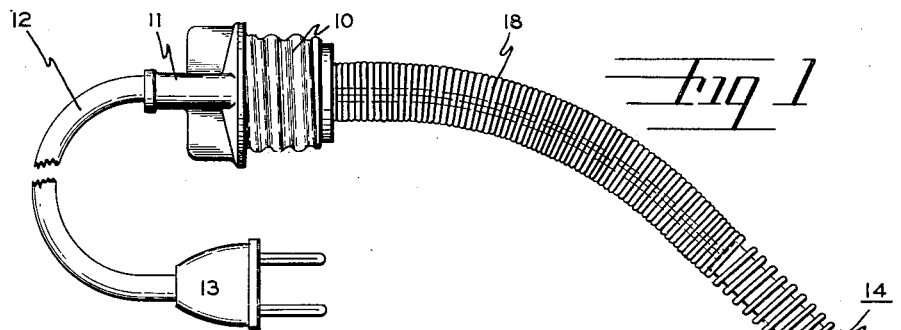
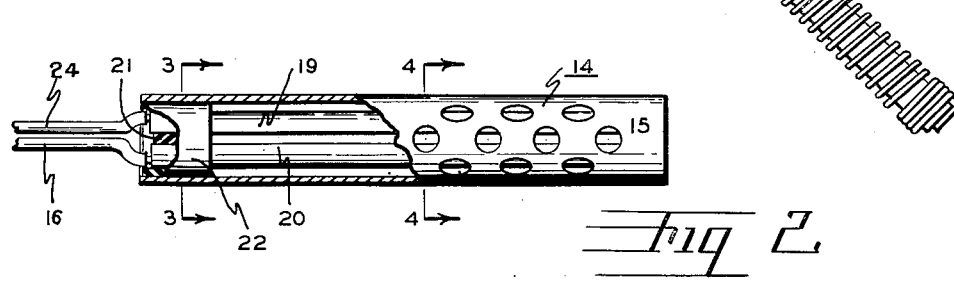
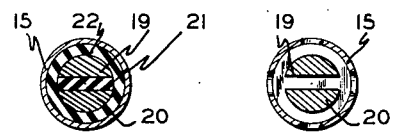 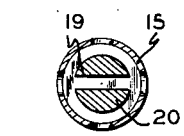
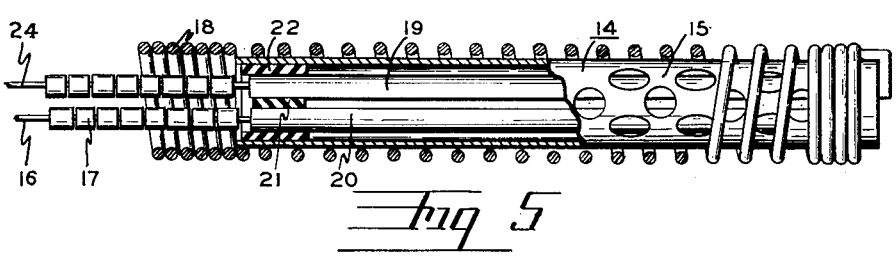
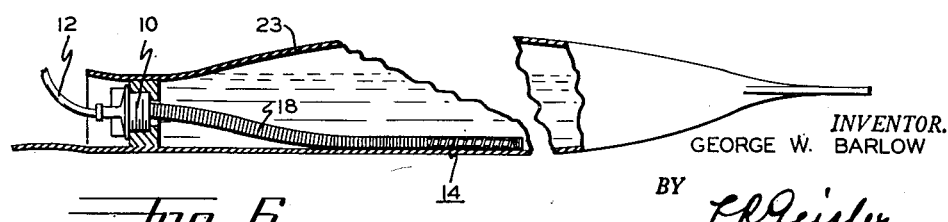
INVENTOR.
GEORGE W. BARLOW
BY
ATTORNEY Patented May 16, 1950

2,507,750

UNITED STATES PATENT OFFICE 2,507,750

HOT-WATER BOTTLE STOPPER AND HEAT MAINTAINER

George W. Barlow, Aberdeen, Wash.

Application August 20, 1948, Serial No. 45,296

2 Claims. (Cl. 219—40)

This invention relates to hot water bags or bottles or containers in which hot water is placed in order to provide a heating surface. Due to the fact that the water gradually cools as the heat is given off, the water bottle must be refilled from time to time when the water bottle is used for prolonged heat application. Not only does the necessity for frequent refilling of the hot water bottle cause annoyance in such instances, but if the refilling is overlooked or neglected too long, as for example in hospital cases, the patient may suffer discomfort and even ill effects.

The object of the present invention is to provide a means whereby the temperature of the hot water in the hot water bottle may be maintained at approximately the same level for a prolonged or indefinite length of time, thus dispensing with the necessity for the refilling of the bottle in order to maintain such desired temperature.

A related object of the invention is to provide a simple, practical means, including an electric element, which will be absolutely fool-proof and which can be used with any ordinary hot water bottle without any possibility of injury to the hot water bottle.

Another object of this invention is to provide a combined heat maintainer and stopper, adapted to be used instead of an ordinary stopper in hot water bottles of any standard size, which can be manufactured and sold at very moderate cost and offered to the public as a replacement for stoppers in hot water bottles in use or now on the market.

These objects and other advantages I attain by providing a combined stopper and electrically operable heat maintainer for hot water bottle, and by making, mounting and arranging the parts and elements in the manner to be briefly described with reference to the accompanying drawings.

In the drawings:

Fig. 1 is an elevation of my entire device;

Fig. 2 is an elevation, on an enlarged scale, of a form of the heating elements and associated shell adapted for employment as a heat maintainer in my device, with a portion of the shell shown broken away for the sake of clarity;

Fig. 3 is a transverse section through the heat maintainer taken on line 3—3 of Fig. 2;

Fig. 4 is a similar section taken on line 4—4 of Fig. 2;

Fig. 5 is an elevation of the heat maintainer, drawn to a still larger scale, with a portion of the shell broken away, with the protective spiral winding shown extending over the shell and conductors, and illustrating a modified form of protective insulation which may be used on the conductor wires; and Fig. 6 is a fore-shortened elevation and longitudinal section of an ordinary hot water bottle illustrating the employment of my invention therewith.

Referring first to Fig. 1, 10 indicates a hot water bottle stopper of standard size and contour, made of any suitable material and adapted to serve as a stopper in any ordinary hot water bottle. Unlike the ordinary hot water bottle stopper, however, the stopper 10 is provided with a channel extending axially therethrough, having an outer channel wall 11, and so arranged as to permit a pair of insulated electric conductor wires to pass through the channel and thus pass through the stopper. On the outside of the stopper these insulated wires are carried in a flexible outer covering 12, such as customarily used for any electric appliance cord, and the wires are connected to an ordinary electric plug 13 by which the attachment may be plugged in to any convenient electric outlet. The channel in the stopper through which the insulated conductor wires pass is sealed with the wires therein so that no leakage of water can occur through the stopper channel.

The two conductor wires continue on beyond the inner end of the stopper 10 for several inches and connect to a heat maintainer which is designated as a whole by the reference character 14. The heat maintainer employed in my device may be constructed of various materials and is not new in itself. In the form in which this heat maintainer is shown in the drawings (see Figs. 2 to 5 inclusive), it is composed of two parallel spaced carbon elements 19 and 20 connected to the conductor wires 24 and 16 respectively. These two carbon elements 19 and 20 are held slightly spaced apart by a short strip of rubber or other insulating material 21 placed between them at each end, and the elements 19 and 20 are held secured in this relative position by a tube 22 of insulating material at each end enclosing their adjacent ends. The elements 19 and 20, with their ends thus held together in spaced position, are housed in a perforated metal tube 15 as shown. The manner in which such elements, when so arranged and when immersed in water act as heating elements is well known. The water serves as a conductor between the two elements, and the resulting passage of current from one element to the other causes the elements and the water surrounding them to become heated. The perforated metal tube 15 serves as a guard to prevent the elements 19 and 20 from coming into direct contact with any conducting medium other than the water, while at the same time the perforations in the tube 15 permit passage of water freely to and from the elements 19 and 20. As apparent, and as is well known, these elements can not produce any heat unless water or some other conducting liquid enters the narrow space between them so as to permit passage of current from one to the other.

A flexible spirally-wound housing 18 (Fig. 1) has one end secured in the stopper 10 and extends from the stopper to the heat maintainer 14. The coils of this spiral winding then continue on over the perforated metal tube 15 of the heat maintainer 14 from one end to the other, but the coils on the outside of the tube 15 are spaced from each other, as shown in Figs. 1 and 5, so as not to interfere with the passage of water into the heat maintainer. Finally, the end of the spiral winding is firmly secured on the far end of the metal tube 15.

Those sections of the conductor wires 16 and 24 which extend from the stopper 10 to the heat maintainer 14, in addition to carrying the ordinary insulating wrapping, are provided with a special outer water-impervious covering in order to prevent any possibility of a short circuit occurring through water soaked insulation or any possibilty of deterioration of the protecting insulation due to wear. Various special insulating means or covering may be used, for example, an outer supplementary insulation of fiber glass, will be found very satisfactory. Another equally satisfactory way in which these wires may be insulated and protected is illustrated in Fig. 5 where each of the wires 16 and 24, having ordinary rubber insulation, passes through a continuous succession of tiny tubes of porcelain or other ceramic or similar material, which tiny tubes permit flexibility while providing an enduring safeguard for each wire.

As previously mentioned, the structure of the heat maintainer 14 itself is old and I do not make any claim to the same by itself but only as part of the combination which constitutes my invention. The amount of heat furnished by the elements 19 and 20 of the heat maintainer 14, when such elements are immersed in a given quantity of water will of course be proportional to the length of the elements. Since with my invention it is not my purpose to raise the temperature of the water in the water bottle but only to maintain the initial temperature of the hot water, or to slow down the dropping of the water temperature to such extent that the hot water bottle can be used for a very prolonged period without refilling, the heating elements such as 19 and 20, which I employ, are made only of sufficient length to serve this specific purpose. Since hot water bottles on the market are generally limited to only one or two sizes, it is not difficult to furnish my device with the proper length of heating element for all standard hot water bottles. Heating elements such as I employ have heretofore been employed for raising the temperatures of the water or other liquid in which they are immersed but, in my device, care must be taken not to have the heating elements capable of raising the temperature of the water in the hot water bottle since some further control would then become necessary to offset the possibility and danger of the water becoming too hot. When my device is equipped with heating elements in my heat maintainer, which are of the proper size for the normal capacity of the hot water bottle, no further control or safeguard will be necessary in the use of my invention.

In Fig. 6 I show a filled hot water bottle 23, of the ordinary type, equipped with my device. The hot water bottle 23 is illustrated as lying on one side in normal position with the heat maintainer in the bottle resting on the bottom side of the water bottle. The protective spiral winding together with the perforated tube 15 will always keep the heating elements in the heat maintainer 14 sufficiently spaced from the adjacent wall surface of the hot water bottle so that no possible overheating or other injury to the water bottle can be caused by the heat maintainer. Due to the flexible spiral spring medium by which the heat maintainer 14 is connected with the stopper 10, the hot water bottle can be rolled around or pushed into any position without the slightest danger of the heat maintainer pressing strongly against any point in the wall of the hot water bottle so as to damage the same. The flexible spiral spring also takes any strain off the conductor wires between the stopper and heat maintainer. There is no danger even with the careless use of my device. When unscrewing the stopper and removing the device from the water bottle, an immediate contact of the hand with the heat maintainer would not produce any injury since no portion of the spiral winding around the perforated tube 15 will ever be too hot to be held in the hand. Furthermore, as soon as the heat maintainer is taken out of the water, the water between the two elements 19 and 20 will quickly evaporate, whereupon the heating of these elements will cease entirely. Consequently even if my device after being removed from the water bottle, is left attached to the electric outlet and, for instance, left lying on the patient's bed, no damage or injury can occur from the same.

Various modifications could be made in the means which I have illustrated and described for carrying out my invention, within the scope of the same. It is not my intention to limit my invention or any part of my device exactly to the construction as shown in the drawings or to place any other limitation on the invention except as set forth in the claims.

I claim:

1. A hot water bottle heat maintainer comprising a hot water bottle stopper, a pair of flexible insulated conductor wires extending through said stopper, the inner ends of said wires terminating a few inches from the inner end of said stopper, a flexible waterproof insulation covering the inner sections of said wires, electric immersion heating means attached to the inner ends of said wires, said heating means being of a size to supply only sufficient heat approximately to make up for the loss of heat by radiation from the hot water bottle, whereby to maintain the approximate temperature of the water within the hot water bottle for a prolonged period but without appreciably increasing the water temperature, a flexible spiral winding attached to the inner end of said stopper and extending from said stopper to and over said heating means, said spiral winding being of approximate uniform diameter throughout its extent, the coils of said flexible spiral winding being close together between said stopper and said heating means and being spaced from each other along said heating means, and means connected with the outer ends of said wires beyond the outer end of said stopper for connecting said wires with a source of electric current.

2. A hot water bottle heat maintainer comprising a hot water bottle stopper, a pair of flexible insulated conductor wires extending through said stopper, the inner ends of said wires terminating a few inches from the inner end of said stopper, a flexible waterproof insulation covering the inner sections of said wires, an electric immersion heater attached to the inner ends of said wires, said heater being of a size to supply only sufficient heat approximately to make up for the loss of heat by radiation from the hot water bottle, whereby to maintain the approximate temperature of the water within the hot water bottle for a prolonged period but without appreciably increasing the water temperature, said heater consisting of a pair of similar spaced electrode elements extending longitudinally of the heater in parallel relationship, a perforated tubular housing surrounding said elements and spaced from said elements throughout, a flexible spiral winding attached to the inner end of said stopper, and extending from said stopper to the further end of said heater, said spiral winding being of approximate uniform diameter throughout its extent, the coils of said flexible spiral winding being close together between said stopper and said heater and being spaced from each other along said perforated tubular housing, and means connected with the outer ends of said wires beyond the outer end of said stopper for connecting said wires with a source of electric current.

GEORGE W. BARLOW.

REFERENCES CITED

The following references are of record in the file of this patent:

UNITED STATES PATENTS

| Number | Name | Date |
|---|---|---|
| 1,002,253 | Fogalsang et al. | Sept. 5, 1911 |
| 1,086,646 | Christian | Feb. 10, 1914 |
| 1,773,546 | Rider | Aug. 19, 1930 |
| 2,223,154 | Thornton-Norris | Nov. 26, 1940 |